(12) United States Patent
Wu et al.

(10) Patent No.: US 11,906,693 B2
(45) Date of Patent: Feb. 20, 2024

(54) VARIABLE-AREA COMB CAPACITOR-BASED MEMS RELATIVE GRAVIMETER PROBE AND GRAVIMETER

(71) Applicant: Huazhong University of Science and Technology, Hubei (CN)

(72) Inventors: Wenjie Wu, Hubei (CN); Bingyang Cai, Hubei (CN); Le Gao, Hubei (CN); Yuanlei Wang, Hubei (CN); Liangcheng Tu, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/253,527

(22) PCT Filed: Aug. 29, 2022

(86) PCT No.: PCT/CN2022/115363
§ 371 (c)(1),
(2) Date: May 18, 2023

(87) PCT Pub. No.: WO2023/231200
PCT Pub. Date: Dec. 7, 2023

(65) Prior Publication Data
US 2023/0384474 A1 Nov. 30, 2023

(51) Int. Cl.
*G01V 7/04* (2006.01)
(52) U.S. Cl.
CPC ...................................... *G01V 7/04* (2013.01)
(58) Field of Classification Search
CPC ...................................................... G01V 7/04
See application file for complete search history.

(56) References Cited

U.S. PATENT DOCUMENTS

| 2003/0140699 A1 | 7/2003 | Pike et al. |
| 2006/0272414 A1* | 12/2006 | Ayazi ................. G01P 15/0802 |
| | | 73/514.32 |

(Continued)

FOREIGN PATENT DOCUMENTS

| CN | 101839923 A | 9/2010 |
| CN | 102156201 A | 8/2011 |

(Continued)

OTHER PUBLICATIONS

International Search Report and Written Opinion issued in PCT/CN2022/115363, dated Dec. 20, 2022, 17 pages provided, with English translation.

(Continued)

*Primary Examiner* — Paul M. West
(74) *Attorney, Agent, or Firm* — Hamre, Schumann, Mueller & Larson, P.C.

(57) ABSTRACT

A gravimeter probe includes a spring structure, a proof mass, movable comb fingers, fixed comb fingers, and an outer frame. A fixed end of the spring structure is arranged on the outer frame and a free end thereof is connected to the proof mass. The movable comb fingers are arranged on upper and lower surfaces of the proof mass, and the fixed comb fingers are correspondingly arranged on the outer frame. Each of the movable comb fingers and the fixed comb fingers has a special-shaped comb finger structure. The special-shaped comb finger structure includes a comb finger bottom portion and a comb finger top portion, and the width of the comb finger bottom portion is smaller than the width of the comb finger top portion.

10 Claims, 5 Drawing Sheets

(56) References Cited

U.S. PATENT DOCUMENTS

| 2010/0024552 | A1 | | 2/2010 | Foster | |
|---|---|---|---|---|---|
| 2011/0174074 | A1 | * | 7/2011 | Li | G01P 15/125 |
| | | | | | 73/504.14 |
| 2019/0146003 | A1 | * | 5/2019 | Reinmuth | G01P 15/125 |
| | | | | | 73/514.24 |

FOREIGN PATENT DOCUMENTS

| CN | 102798734 | A | 11/2012 |
|---|---|---|---|
| CN | 207832823 | U | 9/2018 |
| CN | 109142783 | A | 1/2019 |
| CN | 110806498 | A | 2/2020 |
| CN | 111381073 | A | 7/2020 |
| CN | 111551761 | A | 8/2020 |
| CN | 113702665 | A | 11/2021 |
| CN | 114422923 | A | 4/2022 |
| JP | 2000266777 | A | 9/2000 |

OTHER PUBLICATIONS

Tang, S., Liu, H., Yan, S. et al., "A high-sensitivity MEMS gravimeter with a large dynamic range", Microsyst Nanoeng 5, 45 (2019). https://doi.org/10.1038/s41378-019-0089-7.

Middlemiss, R., Samarelli, A., Paul, D. et al. "Measurement of the Earth tides with a MEMS gravimeter", Nature 531 (7596), 614-617 (2016). https://doi.org/10.1038/nature17397.

* cited by examiner

VARIABLE-AREA COMB CAPACITOR-BASED MEMS RELATIVE GRAVIMETER PROBE AND GRAVIMETER

TECHNICAL FIELD

The present invention pertains to the field of instruments and meters, and relates in particular to a variable-area comb capacitor-based MEMS relative gravimeter probe and a gravimeter applied to precise gravity measurement.

BACKGROUND ART

The distribution of the gravity field depends on the composition and distribution of interior materials of the earth. Precisely measuring the spatial distribution and time-varying characteristics of the gravity field is of great significance to earth science research, disaster warning, geodesy, weapon guidance, ocean detection, resource exploration, etc.

MEMS (micro-electromechanical system) sensors use chip technology to design and process sensing probes, and have the advantages of small size, low cost, easy integration with circuits, and easy batch production. In recent years, the rapid development of MEMS technology and sensing technology has significantly improved the resolution and stability of MEMS acceleration sensors, and has been applied to precise gravity measurement.

The University of Glasgow and Huazhong University of Science and Technology both used an optical shadow displacement transducer to develop an open-loop MEMS gravimeter (Tang Shihao et al. Microsystems & nanoengineering, 2019, 5(1), 1-11; Middlemiss R. P. et al. Nature, 2016, 531(7596): 614-617), but the gravimeter has problems such as low displacement sensing accuracy and slow response speed.

Adopting a force balance operating mode can significantly improve key performance parameters such as the response speed and linearity of a gravimeter. Imperial College of Technology proposed a high-precision MEMS accelerometer (microseismometer) based on surface array capacitive displacement sensing and magnetic closed-loop feedback control (US 20030140699 A1), which significantly improves acceleration sensing accuracy and response speed. However, the magnetic pole is bulky and difficult to integrate, and the magnetic field is susceptible to temperature. Comb accelerometers use comb capacitors to achieve displacement sensing and electrostatic feedback force balance control (CN 101839923 A, CN 102156201 A), and have the advantages of fast response speed, simple film structures, and low power consumption. However, due to thin device layers and the small mass of vibrators, the comb accelerometers have large thermal noise and poor accuracy.

SUMMARY OF THE INVENTION

In view of the defects and improvement needs of the prior art, provided in the present invention are a variable-area comb capacitor-based MEMS relative gravimeter probe and a gravimeter, which aim to improve the sensitivity of capacitive displacement sensing and reduce mechanical thermal noise.

In order to achieve the above purpose, according to one aspect of the present invention, provided is a variable-area comb capacitor-based MEMS relative gravimeter probe, comprising a spring structure, a proof mass, movable comb fingers, fixed comb fingers, and an outer frame. A fixed end of the spring structure is arranged on the outer frame and a free end thereof is connected to the proof mass, the movable comb fingers are arranged on upper and lower surfaces of the proof mass, and the fixed comb fingers are correspondingly arranged on the outer frame.

Each of the movable comb fingers and the fixed comb fingers has a special-shaped comb figure structure, and the special-shaped comb finger structure comprises a comb finger bottom portion and a comb finger top portion, and the width of the comb finger bottom portion is smaller than the width of the comb finger top portion. The comb finger bottom portions of the movable comb fingers are fixed on the proof mass, and the comb finger bottom portions of the fixed comb fingers are fixed on the outer frame.

During operation, the spring structure is used to convert a gravitational acceleration change to be measured into a displacement change of the proof mass, and the comb finger top portions of the movable comb fingers and the comb finger top portions of the fixed comb fingers form a variable-area differential comb capacitor structure, configured to convert the displacement change into a differential capacitance signal.

Further, the central axes of the comb finger bottom portion and the comb finger top portion coincide.

Further, a spacing $d_0$ between the comb finger top portions of the movable comb finger and the fixed comb finger when directly facing each other, a comb finger bottom portion width $w_1$ and a comb finger top portion width $w_2$ satisfy:

$$w_2 - w_1 = 2(n-1)d_0,$$

wherein $$n = \frac{d_1}{d_0},$$

and $d_1$ represents a spacing between the comb finger top portion of the fixed comb finger and the comb finger bottom portion of the movable comb finger that directly face each other when the fixed comb fingers and the movable comb fingers are arranged alternately.

Further, the length of the comb finger bottom portion is greater than the length of the comb finger top portion.

Further, materials of the spring structure, the proof mass, the movable comb fingers, the fixed comb fingers, and the outer frame are SOI.

Further, the thickness of the movable comb finger and the fixed comb finger is 50 μm to 2000 μm.

Further, an output $\Delta C$ of the differential comb capacitor, a spacing $d_0$ between the comb finger top portions of the movable comb finger and the fixed comb finger when directly facing each other, and a thickness $h$ of the movable comb finger and the fixed comb finger satisfy:

$$\Delta C = 2N \frac{\varepsilon h \Delta x}{d_0},$$

where $\varepsilon$ is a dielectric constant, $\Delta x$ is a motion displacement of the proof mass, and $N$ is the number of sets of array capacitor plates of the differential comb capacitor.

Further, the probe further comprises a back-end circuit module, the back-end circuit module comprising a capacitive sensing unit, a feedback control unit, and an electrostatic feedback actuator, where the capacitive sensing unit is used to detect the differential capacitance signal, and to convert the differential capacitance signal into an analog voltage signal;

the feedback control unit is used to determine the amount of deviation of the proof mass from a balanced position according to the analog voltage signal, and to calculate, via a feedback adjustment output, a feedback voltage required for the proof mass to return to the balanced state;

the electrostatic feedback actuator is used to receive the feedback voltage, and to generate, according to a satisfied relationship between the feedback voltage and an electrostatic feedback force, an electrostatic feedback force for controlling the proof mass to remain at the balanced position.

Further, the electrostatic feedback force F and the measured acceleration change $\Delta g$ satisfies:

$$F = -\frac{4N\varepsilon h}{d_0} V_f V_b = m\Delta g,$$

in the equation, m is the mass of the proof mass, $V_f$ is the feedback voltage, $V_b$ is a DC feedback bias voltage applied to the comb finger top portions of the fixed comb fingers and provided by an external power supply, N represents the number of sets of array capacitor plates of the differential comb capacitor, $\varepsilon$ is a dielectric constant, h is the thickness of the movable comb finger and the fixed comb finger, and $d_0$ is a spacing between the comb finger top portions of the movable comb finger and the fixed comb finger when directly facing each other.

According to another aspect of the present invention, provided is a variable-area comb capacitor-based MEMS relative gravimeter, comprising a probe, said probe being the probe described in any description of the first aspect.

Generally speaking, through the above technical solutions conceived by the present invention, the following beneficial effects can be achieved:

(1) In the probe of the present invention, each of the movable comb fingers and the fixed comb fingers is designed to have a special-shaped comb finger structure. The width of the comb finger bottom portion of the special-shaped comb finger structure is smaller than the width of the comb finger top portion. During etching, the comb finger bottom portions of the fixed comb fingers directly face the comb finger top portions of the movable comb fingers, and the comb finger top portions of the fixed comb fingers directly face the comb finger bottom portions of the movable comb fingers. Compared with conventional comb capacitive accelerators, the movable comb fingers and the fixed comb fingers when directly facing each other have a greater spacing therebetween. Under the condition of the same aspect ratio, the depth of etching can be increased, so that the device of the present invention can adopt a thick silicon layer of an SOI silicon wafer, and on such basis, the mass of the proof mass can be increased, and mechanical and thermal noise can be reduced.

(2) The probe of the present invention allows the movable comb fingers to be engaged with the fixed comb fingers by means of displacement of the proof mass under the action of gravity, and the comb finger top portions of the movable comb fingers at the upper and lower ends of the proof mass and the comb finger top portions of the fixed comb fingers have the same direct-facing area, thereby reaching a balanced state. When an acceleration signal is inputted from the outside, the acceleration signal to be measured is converted into a displacement signal through the spring structure, and the comb finger top portions of the fixed comb fingers and the movable comb fingers form a variable-area differential capacitor structure. Compared with the initial etching state, the inter-comb-finger gap is reduced, the sensitivity of displacement sensing is increased, thereby overcoming the restriction of the limited aspect ratio of reactive ion deep etching on the inter-comb-finger spacing of thick device layers, and achieving high-sensitivity force-balanced gravity acceleration sensing.

(3) Furthermore, on the basis of the special-shaped comb fingers designed in the present invention, closed-loop control between the acceleration changes to be measured and an electrostatic feedback force is achieved in cooperation with the back-end circuit module including the capacitive sensing part, the feedback control part, and the electrostatic feedback actuator. Compared with open-loop control, this structure can improve the response speed and anti-interference capability of the gravimeter. Compared with electromagnetic closed-loop feedback control, this structure does not require a capacitive moving plate and a capacitive fixed plate to be prepared respectively on a silicon-based material and a glass upper cover, thereby simplifying processing processes and reducing the volume of the device.

BRIEF DESCRIPTION OF THE DRAWINGS

In all of the drawings, the same reference numerals are used to refer to the same elements or processes, wherein.

1: spring structure, 2: proof mass, 3: movable comb finger, 4: upper fixed comb finger, 5: lower fixed comb finger, 6: outer frame, 7: comb finger top portion, 8: comb finger bottom portion.

DETAILED DESCRIPTION

To make the purpose, technical solution, and advantages of the present invention clearer, the present invention is further described in detail below in connection with the accompanying drawings and embodiments. It should be understood that the specific embodiments described herein are only used to explain the present invention, but not to limit the present invention. In addition, the technical features involved in the various embodiments of the present invention described below can be combined with each other provided that they do not constitute a conflict with each other.

In the present invention, the terms "first", "second", and the like in the present invention and the drawings are used to distinguish similar objects, and are not necessarily used to describe a specific order or sequence.

Figure 1:
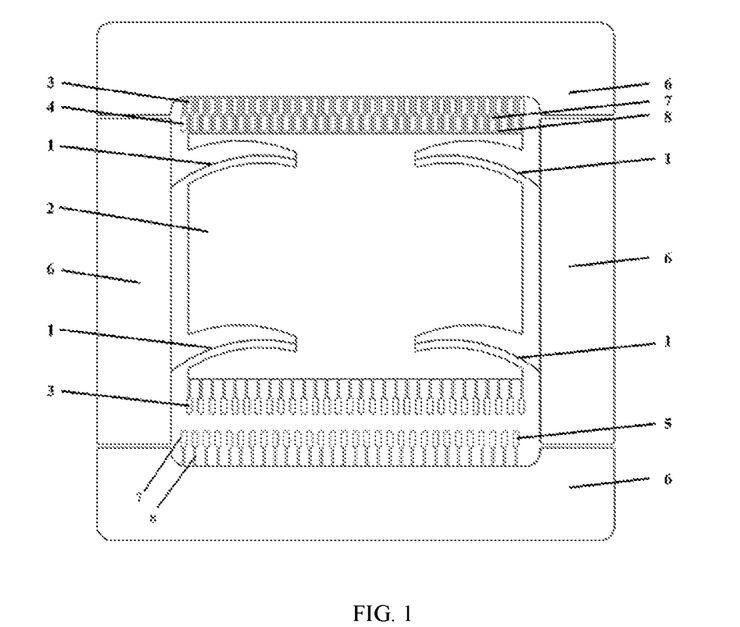
FIG. 1 is a schematic structural diagram of a variable-area comb capacitor-based MEMS relative gravimeter probe of the present invention.
Figure 2:
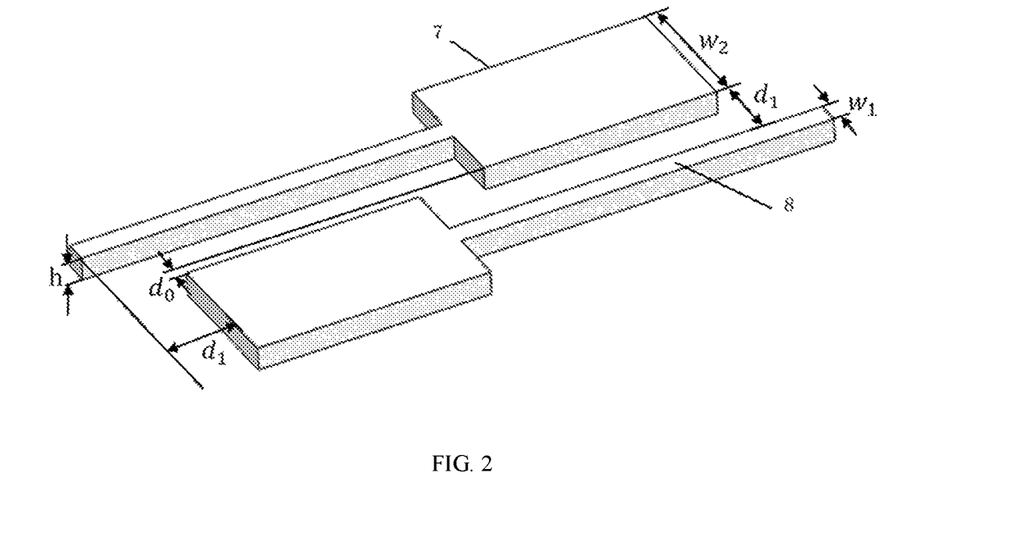
FIG. 2 is a schematic diagram of a special-shaped comb finger structure of the present invention.

As shown in FIG. 1 and FIG. 2, the variable-area comb capacitor-based MEMS relative gravimeter probe of the present invention mainly includes: a spring structure 1, a proof mass 2, movable comb fingers 3, fixed comb fingers, and an outer frame 6. A fixed end of the spring structure 1 is arranged on the outer frame 6 and a free end thereof is connected to the proof mass 2. The movable comb fingers 3 are arranged on upper and lower surfaces of the proof mass 2. The fixed comb fingers include upper fixed comb fingers 4 and lower fixed comb fingers 5 correspondingly and separately arranged on the outer frame 6. The movable comb fingers 3 on the upper and lower surfaces of the proof mass 2 and the corresponding upper fixed comb fingers 4 and lower fixed comb fingers 5 respectively form a differential comb capacitor. Each of the movable comb fingers and the fixed comb fingers has a special-shaped comb finger structure. The special-shaped comb finger structure includes a comb finger bottom portion 8 and a comb finger top portion 7 which are integrally formed. The central axes of the comb finger bottom portion and the comb finger top portion coincide, the width of the comb finger bottom portion is smaller than the width of the comb finger top portion, and the comb finger bottom portions are fixed on the proof mass or the outer frame, that is, the comb finger bottom portions of the movable comb fingers are fixed on the proof mass, and the comb finger bottom portions of the fixed comb fingers are fixed on the outer frame. During operation, the comb finger top portions of the movable comb fingers at the upper and lower ends of the proof mass and the comb finger top portions of the fixed comb fingers on the outer frame form a variable-area differential comb capacitor structure.

Preferably, the length of the comb finger bottom portion is greater than the length of the comb finger top portion, which is conducive to achieving the equal widths and same etching rates of etched regions and uniform shapes of etched comb fingers during processing of the comb capacitor, making it possible to improve the detection accuracy of the capacitor plate. It should be noted that the width in the present invention refers to the dimension in an x-axis direction, and the length refers to the dimension in a y-axis direction.

The proof mass, the movable comb fingers, and the spring structure are suspended through DRIE (deep reactive ion etching) processing, and this part can generate displacement vibration relative to the outer frame.

The proof mass is used to detect an acceleration signal to be measured. The acceleration to be measured is converted into a displacement change of the proof mass, the displacement change is converted into a capacitance through the differential comb capacitor, and the detected capacitance change is then converted into a voltage signal output through a matching circuit, and a corresponding acceleration is finally obtained after data processing.

Figure 3:
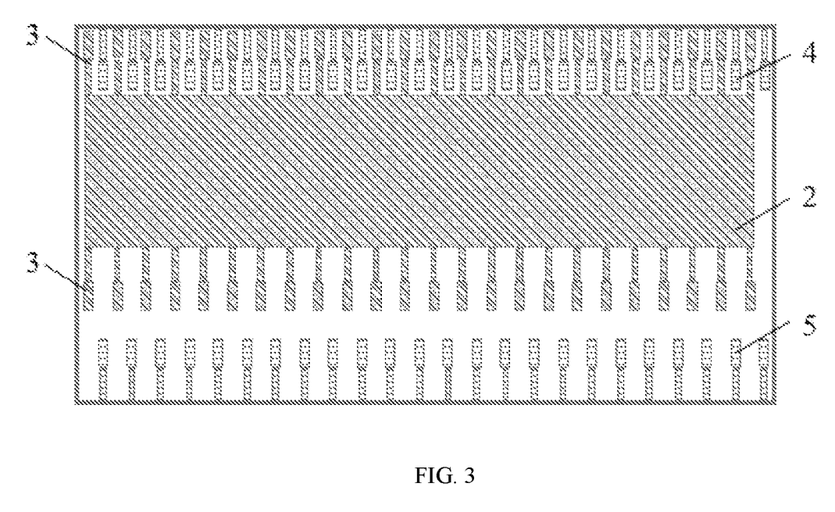
FIG. 3 is a schematic diagram of a variable-area comb capacitor of the present invention without the action of gravity (in a processing state).

During processing of the comb capacitor of the present invention, the fixed comb fingers and the movable comb fingers are alternately arranged, that is, the fixed comb fingers and the movable comb fingers are completely engaged together, and the comb finger bottom portions of the fixed comb fingers directly face the comb finger top portions of the movable comb fingers, and the comb finger top portions of the fixed comb fingers directly face the comb finger bottom portions of the movable comb fingers. At this time, the fixed comb fingers and the movable comb fingers that directly face each other have the same inter-comb-finger spacing therebetween, which is denoted as $d_1$. In the fixed comb fingers and the movable comb fingers, the width of the comb finger bottom portion is $w_1$, and the width of the comb finger top portion is $w_2$, where $w_1<w_2$. As shown in FIG. 3, since the width of the comb finger bottom portion is smaller than that of the comb finger top portion, the fixed comb fingers and the movable comb fingers are arranged alternately during etching. Compared with existing capacitors whose fixed comb fingers and movable comb fingers each have a equal-width comb finger structure, the spacing between comb fingers when directly facing each other in the present invention can be larger during layout design and processing, which is beneficial to reducing the limitation of the aspect ratio of a region to be etched and alleviating process problems such as release adhesion.

Figure 4:
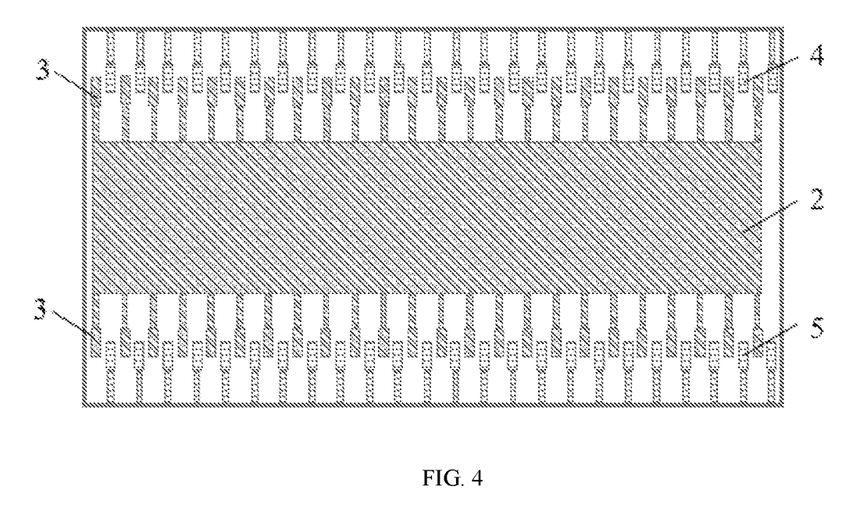
FIG. 4 is a schematic diagram of a variable-area comb capacitor of the present invention when reaching a balanced state under the action of gravity.

As shown in FIG. 4, due to the action of the gravity of the proof mass, the movable comb fingers move down. When the probe of the present invention is in balance, the comb finger top portions of the movable comb fingers at the upper and lower ends of the proof mass and the comb finger top portions of the fixed comb fingers have the same direct-facing area, thereby forming a differential variable-area capacitor structure. A spacing between the comb finger top portions of the movable comb finger and the fixed comb finger when directly facing each other is denoted as do, that is, the spacing between the movable comb finger and the fixed comb finger when directly facing each other is reduced compared with the original plate spacing $d_1$, thereby improving the sensitivity of the differential comb capacitor structure and increasing the front-end gain of the entire system.

To achieve the effect of reducing the inter-comb-finger spacing by n times, that is, $d_1=nd_0$, the relationship between the width of the comb finger bottom portion and the width of the comb finger top portion satisfies:

$$w_2 - w_1 2(n-1)d_0$$

During operation of the probe of the present invention, when an acceleration signal is inputted from the outside, the acceleration signal to be measured is converted into a displacement signal through the spring structure, and then the displacement signal is converted into a capacitance signal through comb capacitor plates, in which comb fingers arranged vertically and symmetrically form a differential capacitor structure. The differential configuration can eliminate most interference noise and improve a signal-to-noise ratio. For array capacitor plates composed of N sets of variable-area comb capacitor plates, the relationship between the differential capacitance output and the displacement is:

$$\Delta C = 2N \frac{\varepsilon h \Delta x}{d_0}$$

In the equation, $\varepsilon$ is the dielectric constant of a capacitor medium. It can be known from this equation that the amplitude of the differential capacitance is directly proportional to the number N of pairs of comb capacitor plates, the motion displacement $\Delta x$ of the proof mass, and the comb finger thickness h, and is inversely proportional to the spacing $d_0$ between the comb finger top portions of the movable comb finger and the fixed comb finger when directly facing each other.

Therefore, compared with equal-width comb finger structure capacitors in the prior art, the comb capacitor of the present invention has a smaller inter-comb-finger spacing during operation, which can improve displacement sensing sensitivity and reduce mechanical and thermal noise. The "special-shaped" engagement-type comb capacitor design of the present invention enables the movable comb fingers to move down when the probe is operating, and to form a differential capacitor structure together with the upper fixed comb fingers and the lower fixed comb fingers, and most interference noise can be eliminated through the differential configuration, and the signal-to-noise ratio can be improved.

In this embodiment, the spring structure includes four groups of springs, which are symmetrically arranged on two sides of the outer frame in pairs. Under the action of the gravity of the proof mass itself, each group of springs deforms to generate a resultant force that cancels out the gravity of the proof mass, thereby achieving quasi-zero stiffness.

In this embodiment, the material of the entire device is preferably SOI, that is, an SOI silicon wafer having a device thickness (i.e., the comb finger thickness h) of 50 µm to 2000 µm. Since the comb capacitor of the present invention, during etching, has a larger spacing between comb fingers that directly face each other, compared with conventional comb capacitor accelerometers, the present invention has a greater etching width under the same aspect ratio etching limitation. Therefore, the etching depth can be increased, so that the device of the present invention can adopt a thick silicon layer of an SOI silicon wafer. On this basis, the mass of the proof mass can be increased, and mechanical and thermal noise can be significantly reduced.

At the same time, for the variable-area comb capacitor design, the direct-facing area of the comb capacitor can be increased to improve the sensitivity of capacitive displacement sensing.

Compared with a magnetic feedback control mode, the MEMS gravity sensor chip of the present invention has a simple film layer structure, and comb fingers are directly etched on silicon, resulting in less heat generation and improving long-term stability. In addition, environmental disturbance problems such as temperature effects and magnetic effects introduced by permanent magnets in the magnetic feedback control are also avoided.

The device of the present invention can adopt a thick silicon layer design of an SOI silicon chip and increase the mass of the proof mass, thereby reducing mechanical and thermal noise. The special-shaped comb finger design is used to construct a differential displacement sensor, and the displacement of the proof mass due to gravity is used to engage the movable comb fingers with the fixed comb fingers, thereby reducing the inter-comb-finger gap to increase the sensitivity of displacement sensing, overcoming the restriction of the limited aspect ratio of reactive ion deep etching on the inter-comb-finger spacing of thick device layers, and finally achieving high-sensitivity force-balanced gravity acceleration sensing.

Figure 5:
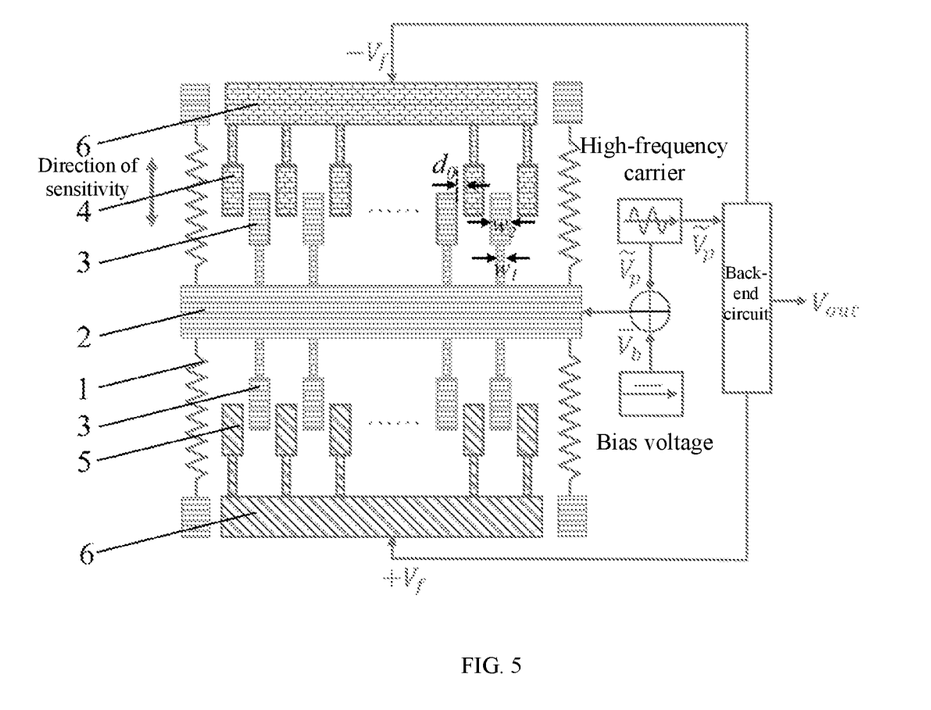
FIG. 5 is a schematic diagram of a closed-loop control process of the gravimeter probe of the present invention.

On the basis of the special-shaped comb fingers designed above, the probe of the present invention is further matched with a back-end circuit module including at least three parts, that is, a capacitive sensing unit, a feedback control unit, and an electrostatic feedback actuator, thereby achieving electrostatic closed-loop control of the whole probe. The fixed comb fingers are distributed vertically, and fixed comb fingers of the same polarity are connected together. When the gravimeter is operating in a closed loop, opposite feedback voltages $V_f$ are respectively applied to the comb finger top portions of the upper fixed comb fingers and the comb finger top portions of the lower fixed comb fingers, so as to generate an electrostatic feedback force F to balance an inertial force brought by the acceleration to be measured. The comb finger top portions of the upper fixed comb fingers and the comb finger top portions of the lower fixed comb fingers serve as a detection part, and can also be used for feedback.

Specifically, as shown in FIG. 5, during operation, the spring structure senses a change in the gravitational acceleration to be measured, and converts the gravitational acceleration change into a displacement change Ax of the spring structure, driving the proof mass to move within the frame. The variable-area differential comb capacitor structure formed by the comb finger top portions of the movable comb fingers and the comb finger top portions of the fixed comb fingers converts the displacement change into a differential capacitance signal, which is related to the residual acceleration signal provided by the detection spring structure, the proof mass, and the comb fingers. The residual acceleration signal represents the magnitude of an external input acceleration signal in the direction of an axis of sensitivity.

The capacitive sensing unit detects the differential capacitance signal, and converts the differential capacitance signal into an analog voltage signal.

The feedback control unit determines the amount of deviation of the proof mass from a balanced position according to the analog voltage signal, and calculates, via a feedback adjustment output, a feedback voltage $V_f$ required for the proof mass to return to the balanced state, where the feedback adjustment control adopts a PID control algorithm in this embodiment.

After receiving the feedback voltage, the electrostatic feedback actuator generates, according to a satisfied relationship between the feedback voltage and the electrostatic feedback force F, a corresponding electrostatic feedback force to control the proof mass to maintain in the balanced position, thereby achieving closed-loop control between the acceleration change to be measured and the electrostatic feedback force.

The relationship between the feedback voltage and the electrostatic feedback force F is:

$$F = \frac{4N\varepsilon h}{d_0} V_f (V_p - V_b)$$

In the equation, $V_f$ is the feedback voltage applied to the comb finger top portions of the fixed comb fingers, $V_p$ is the amplitude of a high-frequency carrier signal applied to the comb finger top portions of the fixed comb fingers, and $V_b$ is a DC feedback bias voltage applied to the comb finger top portions of the fixed comb fingers and provided by an external power supply.

Since the carrier frequency is far higher than the response frequency of a spring vibrator, the influence of the electrostatic feedback force generated by $V_p$ can be ignored. In this case, the electrostatic feedback force F is:

$$F = -\frac{4N\varepsilon h}{d_0} V_f V_b = m\Delta g$$

In the equation, m is the mass of the proof mass, Ag is the gravitational acceleration change to be measured, N is the number of sets of array capacitor plates of the differential comb capacitor, ε is the dielectric constant, h is the thickness of the movable comb finger and the fixed comb finger, and $d_0$ is a spacing between the comb finger top portions of the movable comb finger and the fixed comb finger when directly facing each other.

Compared with open-loop control, the electrostatic closed-loop feedback used in the present invention to control a sensitive unit to be at a balanced position can improve the response speed and anti-interference capability of the gravimeter. Compared with electromagnetic closed-loop feedback, the present structure does not require a capacitive movable plate and a capacitive fixed plate to be prepared respectively on a silicon-based material and a glass upper cover, thereby simplifying processing processes and reducing the volume of the device.

Further provided in the present invention is a variable-area comb capacitor-based MEMS relative gravimeter including a probe, and said probe is the probe described above.

Those skilled in the art could easily understand that the foregoing description is only preferred embodiments of the present invention and is not intended to limit the present invention. All the modifications, identical replacements and improvements within the spirit and principle of the present invention should be in the scope of protection of the present invention.

The invention claimed is:

1. A variable-area comb capacitor-based MEMS relative gravimeter probe, characterized by: comprising a spring structure, a proof mass, movable comb fingers, fixed comb fingers, and an outer frame, a fixed end of the spring structure being arranged on the outer frame and a free end thereof being connected to the proof mass, the movable comb fingers being arranged on upper and lower surfaces of the proof mass, and the fixed comb fingers being correspondingly arranged on the outer frame;

wherein each of the movable comb fingers and the fixed comb fingers has a special-shaped comb finger structure, the special-shaped comb finger structure comprises a comb finger bottom portion and a comb finger top portion, and the width of the comb finger bottom portion is smaller than the width of the comb finger top portion; the comb finger bottom portions of the movable comb fingers are fixed on the proof mass, and the comb finger bottom portions of the fixed comb fingers are fixed on the outer frame;

during operation, the spring structure is used to convert a gravitational acceleration change to be measured into a displacement change of the proof mass, and the comb finger top portions of the movable comb fingers and the comb finger top portions of the fixed comb fingers form a variable-area differential comb capacitor structure, configured to convert the displacement change into a differential capacitance signal.

2. The probe according to claim 1, wherein the central axes of the comb finger bottom portion and the comb finger top portion coincide.

3. The probe according to claim 2, wherein a spacing $d_0$ between the comb finger top portions of each of the movable comb fingers and adjacent each of the fixed comb fingers when directly facing each other, a comb finger bottom portion width $w_1$, and a comb finger top portion width $w_2$ satisfy:

$$w_2 - w_1 = 2(n-1)d_0,$$

wherein $$n = \frac{d_1}{d_0},$$

and $d_1$ represents a spacing between the comb finger top portion of each of the fixed comb fingers and the comb finger bottom portion of adjacent each of the movable comb fingers that directly face each other when the fixed comb fingers and the movable comb fingers are arranged alternately.

4. The probe according to claim 2, wherein the length of the comb finger bottom portion is greater than the length of the comb finger top portion.

5. The probe according to claim 1, wherein materials of the spring structure, the proof mass, the movable comb fingers, the fixed comb fingers, and the outer frame are SOI.

6. The probe according to claim 5, wherein the thickness of each of the movable comb fingers and each of the fixed comb fingers is 50 μm to 2000 μm.

7. The probe according to claim 6, wherein an output ΔC of the differential comb capacitor, a spacing $d_0$ between the comb finger top portions of each of the movable comb fingers and adjacent each of the fixed comb fingers when directly facing each other, and a thickness h of each of the movable comb fingers and each of the fixed comb fingers satisfy:

$$\Delta C = 4N \frac{\varepsilon h \Delta x}{d_0},$$

where ε is a dielectric constant, Δx is a motion displacement of the proof mass, and N is the number of sets of array capacitor plates of the differential comb capacitor.

8. The probe according to claim 1, further comprising a back-end circuit module, the back-end circuit module comprising a capacitive sensing unit, a feedback control unit, and an electrostatic feedback actuator;

wherein the capacitive sensing unit is used to detect the differential capacitance signal, and to convert the differential capacitance signal into an analog voltage signal;

the feedback control unit is used to determine the amount of deviation of the proof mass from a balanced position according to the analog voltage signal, and to calculate, via a feedback adjustment output, a feedback voltage required for the proof mass to return to the balanced state;

the electrostatic feedback actuator is used to receive the feedback voltage, and to generate, according to a satisfied relationship between the feedback voltage and an electrostatic feedback force, an electrostatic feedback force for controlling the proof mass to remain at the balanced position.

9. The probe according to claim 8, wherein the electrostatic feedback force F and the acceleration change Δg to be measured satisfies:

$$F = -\frac{4N\varepsilon h}{d_0} V_f V_b = m\Delta g,$$

in the equation, m is the mass of the proof mass, $V_f$ is the feedback voltage, $V_b$ is a DC feedback bias voltage applied to the comb finger top portions of the fixed comb fingers and provided by an external power supply, N represents the number of sets of array capacitor plates of the differential comb capacitor, c is an dielectric constant, h is the thickness of each of the movable comb fingers and each of the fixed comb fingers, and $d_0$ is a spacing between the comb finger top portions of each of the movable comb fingers and adjacent each of the fixed comb fingers when directly facing each other.

10. A variable-area comb capacitor-based MEMS relative gravimeter, comprising a probe, characterized in that: said probe is the probe according to claim 1.

* * * * *